April 15, 1952  S. G. BERKOW  2,592,533
DERMASECTOR
Filed June 27, 1946
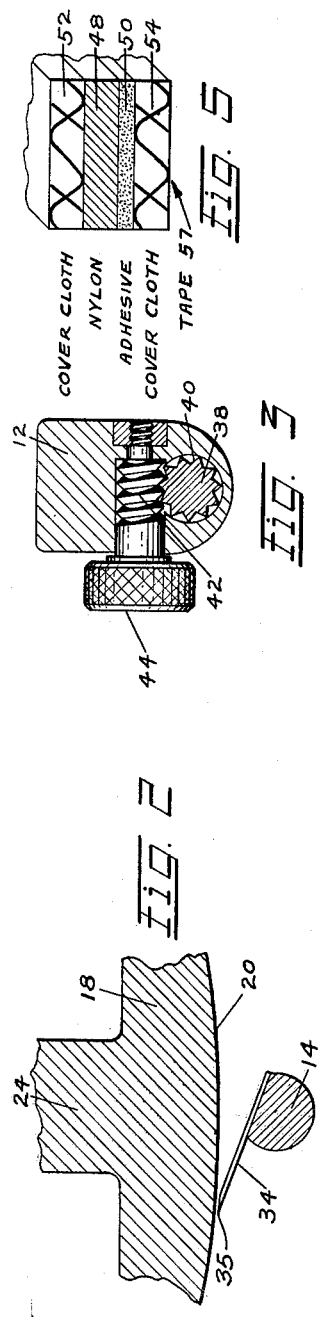
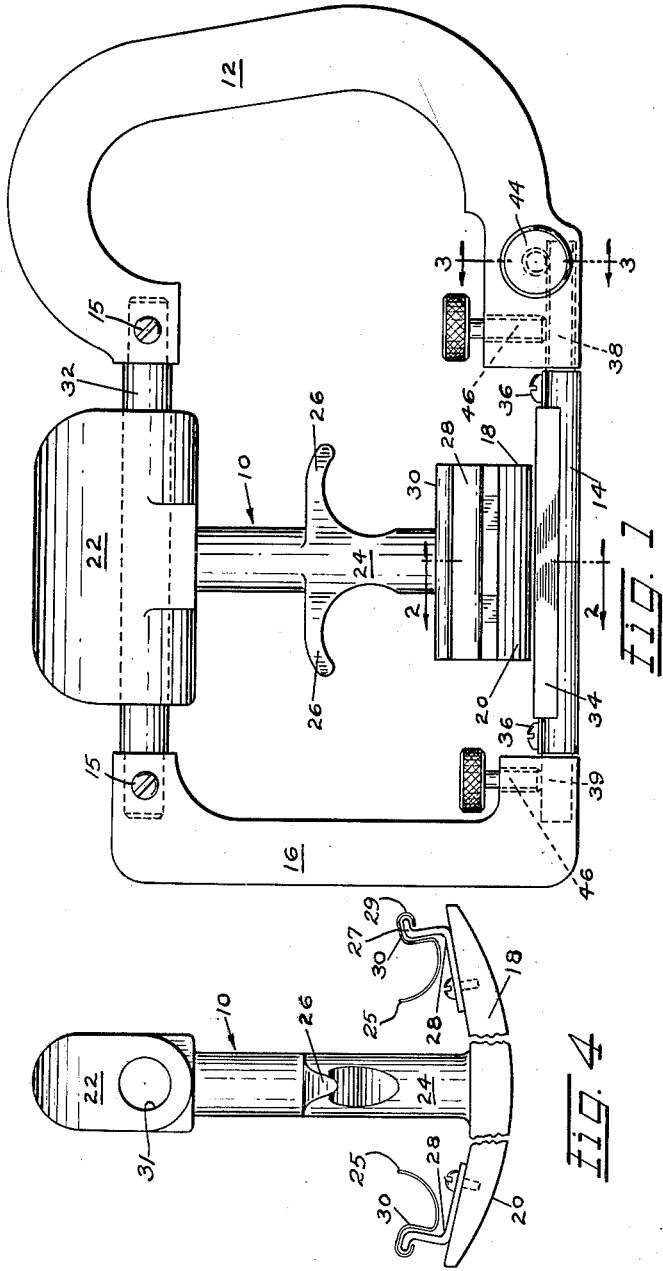
INVENTOR.
SAMUEL GORDON BERKOW
BY M. O. Hayes
ATTORNEY Patented Apr. 15, 1952

2,592,533

UNITED STATES PATENT OFFICE 2,592,533

DERMASECTOR

Samuel Gordon Berkow, Perth Amboy, N. J.

Application June 27, 1946, Serial No. 679,632

7 Claims. (Cl. 128—305)

(Granted under the act of March 3, 1883, as amended April 30, 1928; 370 O. G. 757)

This invention pertains to the art of grafting skin. The invention is embodied in a dermasector skin grafting. More specifically it is concerned with a tape method of skin grafting and a cutting instrument therefor.

Devices for cutting skin from the human body have been known (see U. S. Patent No. 2,288,709 to Hood). These earlier devices had handicaps and were not available for all conditions.

It is an object of the invention to provide a dermasector the depth of the cut of which may be regulated with one hand while the other hand is free to hold the device and which can be regulated from one end of the cutting element; to provide a dermasector that can be firmly held in one hand without danger of slipping; and to provide a dermasector that can positively hold taut the tape that is to carry the skin to be grafted. The dermasector of the present invention can cut extremely thin layers of skin without danger of rupture and it does not require foreign material to be applied to the skin to be cut and left upon it, except the tape that is to carry the skin.

Further objects and advantages of this invention, as well as its construction, arrangement and operation, will be apparent from the following description and claims in connection with the accompanying drawing, in which, Fig. 1 is a side elevation of a device embodying the invention, Fig. 2 is a fragmentary cross-sectional elevation, taken along the line 2—2 of Fig. 1, Fig. 3 is a cross-sectional elevation, taken along the line 3—3 of Fig. 1, Fig. 4 is an end elevation of the device shown in Fig. 1, certain parts thereof being removed, and Fig. 5 is a schematic cross-section of a piece of cloth of the type employed in the practice of the invention.

The device of the present invention comprises a carrier, generally designated 10, that is employed to receive the donor area of skin while it is being severed from the donor, and to support the skin in readiness for it to be applied to the recipient area. The carrier can also be employed in the operation of applying the donor skin to the recipient area.

The carrier 10 comprises the rigid piece 18 that includes the convexly curved surface 20. The piece 18 is attached to one end of the pedestal 24, the attachment being on the side of the piece 18 opposite the curved surface 20. The hand grip 22 is attached to the other end of the pedestal 24, and finger grips 26 are preferably provided attached to the pedestal along its length displaced a distance away from the hand grip that enables the carrier 10 to be held firmly in the hand of the operator.

Under preferred practice the described structure of the piece 18, the pedestal 24 and the hand grip 22 is of solid metal and is made considerably heavy. This enables the grafting operation to be carried out with steadiness and surety. Other suitable material may be used. The carrier 10 enables the curved surface 20 to be rolled manually on the skin surface the movement being employed in the operation of severing the area of donor skin in a manner that will be described more fully hereinafter.

The area of the curved surface 20 is made large enough to encompass whatever size of skin area it might become desirable to graft in one piece, the surface 20 being made somewhat wider to provide an overlap, and somewhat longer to accommodate the carrier cloth that is employed in practicing the invention in a manner that will be described more fully hereinafter. In practice the convex surface of the piece 18 is approximately 1.5" wide and approximately 5.0" long, and this construction has been found satisfactory for practice of the invention.

A cutter 34 is provided, held in position with its cutting edge 35 spaced away from the surface 20 a predetermined distance as illustrated in Fig. 2. The cutter is mounted to swing in a path that is parallel with the curved surface, the edge 35 being held spaced away from the surface 20 the precise predetermined distance throughout the swing of the cutter 34. This establishes the thickness of the skin that is severed from the donor area and makes it uniform throughout its area. It also enables several pieces of skin to be cut uniformly to like thicknesses, for example, when an area of skin is to be grafted that is made up of several pieces positioned edge to edge on the recipient area.

For the described purpose, the curved surface is contoured to describe an arc of a cylinder, the central axis of which is preferably positioned in the hand grip 22 to locate it within the fist of the operator when his hand and fingers engage the grips 22 and 26 in the normal manner of operating the device. The bore 31, Fig. 4, is positioned coincident with the center of curvature of the surface 20, and the pintle 32 is provided to fit the bore 31 and is adapted to rotate in the journal provided by the bore. This construction enables the cutter 34 to be swung in an arcuate path that is parallel to the arcuate surface 20.

Arms 12 and 16 are attached to respective opposite ends of the pintle 32, by means of the set screws 15 for example. The cutter 34 is attached to the cutter support bar 14 by any suitable means such as the screws 36. The end trunnion 38 of the bar 14 is projected into the arm 12 at its end opposite the pintle 32, and in a similar manner the other end trunnion 39 of bar 14 is projected into the arm 16 at its end opposite the pintle 32. The bar 14 is thus disposed parallel with the pintle 32, the lengths of the arms 12 and 16 between their attachments to the pintle 32 and the bar 14 being equal.

It will be noted that the structure throughout, including the arms 12 and 16, the pintle 32 and the bar 14, are preferably constructed of solid metal and with considerable weight. Light and flimsy construction would detract from precision operation of the device. In practice, the device of the present invention operates to cut donor skin in thicknesses of from one to a few thousandths of an inch, and to uniformity within limits measurable in fractions of thousandths of an inch. The sturdy construction of the device of the present invention is one of the principal factors that enables such precision operation.

The trunnions 38 and 39 are mounted to rotate in their sockets of the respective arms 12 and 16 for adjustably varying the spacing between surface 20 and the edge 35 of the cutter 34. The trunnion 38 is provided with the worm wheel 40, Fig. 3, that is driven by the worm 42, the drive being manual by means of the knob 44. Rotation of the knob 44 operates to rotate the bar 14 on its axis, and this operates to position the edge 35 of the cutter 34 either nearer to or further away from the surface 20 selectively, depending upon the direction of rotation of the knob 44. See Fig. 2. A conventional set of thickness or feeler gages can be employed to adjust the spacing of the edge 35 accurately the desired amount. Under preferred practice the worm and worm wheel 40, 42 are machined to a tight mesh and without backlash. This enables precise operation, and by this means the cutter is held by the worm wheel to maintain its position of adjustment. The thumb screws 46 are provided as additional means for holding the cutter in position of adjustment.

At least one of the arms 12 is preferably constructed to form a hand grip as shown. The pintle 32 is made longer than the bore 31 for its longitudinal reciprocation. Grasping the handle of the arm 12, the operator is able to reciprocate the cutter 34 longitudinally of its cutting edge 35 to produce slicing action, and meantime he rotates the pintle 32 in the bore 31 whereby a thickness of skin of predetermined area is severed from the donor. As part of the same operation, the carrier 10 is actuated with the other hand to roll surface 20 on the donor skin, which is held against the surface 20 by adhesion. Rolling the convex surface 20 lifts the donor skin to feed it to the cutting edge 35, which is positioned manually by handle 12 to be kept located where the skin is lifted the desired amount.

Under preferred practice, the donor skin is transferred from the donor to the recipient in condition of being adhered to a carrier cloth. Pursuant to this purpose the carrier cloth is attached to the convex surface 20 in backing engagement therewith during the operation of severing the skin from the donor area. Clamps are provided to hold a piece of carrier cloth pressed against the bulge of the convex surface 20 in position to receive the donor skin and hold it while it is being cut from the donor, the carrier cloth also serving to hold the donor skin until it becomes grafted on the recipient.

Each clamp comprises the cleat 28, attached to the piece 18, preferably on the side thereof opposite the surface 20 where it does not reduce the effective area of its backing surface 20 and thus diminish the area of donor skin that can be transferred from the donor to the recipient with the device of the present invention. Each cleat 28 comprises the terminal flange 27, and a resilient or spring clip 30 is provided for each cleat 28, the clip 30 being provided with the groove 29 companion to the flange 27. The several flanges 27 and their respective companion grooves 29 are directed in opposite directions away from each other to provide tortuous reentrant paths for the cloth that operate to take up slack thereof when the cloth is stretched and clamped onto the piece 18. The end of a strip of cloth is clamped in one of the clamps 28, 30, and is spread smoothly over the surface 20 to position its other end for engagement by the other clamp. When the clip 30 of the second clamp is applied to its cleat 28 with the fabric between, slack is taken up, and tension is applied to the cloth to stretch it taut over the convex surface 20 and in facing engagement therewith. Each clip 30 is provided with a finger grip 25 to facilitate its attachment to and removal from its cleat 28.

The cloth for use with the present instrument and method should have substantially no stretch, should be adhesive and easily pliable, give no skin irritation or allergic reaction, preferably be transparent and should have the ability to withstand autoclaving for 15 minutes at 250° C. and 15 pounds pressure withous significant loss of the before-mentioned properties. Some substances that are pliable to an extent, e. g., paper, are unsuitable because they are not pliable enough. Paper will bend in a little fold which may give a mis-cut or allow undesirable collection of secretions thereunder. The pliability of a soft cloth is needed and is denoted herein by "easily pliable."

The carrier cloth can be woven or otherwise fabricated in any suitable manner that resists stretching in the longitudinal and transverse directions, and should be constructed of a yarn that is strong and stretch inhibiting. The cloth should be of uniform thickness, and to this end yarns of uniform thickness should be employed in the fabrication of the fabric. Accordingly, a strong, stretch-inhibiting yarn of synthetic filament has been found most suitable for the purpose. Instead of the cloth being cut to width, it preferably is provided in the form of a ribbon or tape, fabricated to a desired width to fit the width of the surface 20, such a fabric having non-ravelling edges.

The carrier cloth should be impregnated with an adhesive, or coated with an adhesive on one surface at least that is the exposed surface when the cloth is positioned in facing relationship with the surface 20 of the piece 18. Under preferred practice the cloth is provided already prepared with an adhesive instead of the adhesive being applied when the carrier 10 is being readied for use. Manufacturing controls of fabricating the cloth enable uniform thickness of adhesive to be attained more easily, and it is preferred to eliminate from the operation of making a skin graft the problem of providing uniform adhesive thickness.

As illustrated in Fig. 5, a suitable structure of ribbon 57 comprises the cloth 48, with a coating 50 of adhesive, which may be a natural or synthetic rubber compound. A coating of .004" has been found satisfactory for the tape 57, which may have an upper protective sheet 52, if desired, and a lower sheet 54 to protect the coating 50. The lower sheet 54 is removed before the tape is used.

The operation of the device and method are as follows: The donor and recipient skin areas are prepared as usual, washed with alcohol and rinsed with ether. A test piece of the tape is tautly attached to the surface 20 in the manner hereinbefore described, with its adhesive side exposed. The skin carrier 10 is held in one hand engaging the hand and finger grips 22 and 26, while the knob 44 is adjusted with the other hand to bring the edge 35 of the knife 34 the desired distance from the surface of the adhesive 50 on the tape 57. This usually is done by visual inspection but gages of a conventional set of feeler gages can be used if desired. The distance between the adhesive and the knife edge determines exactly the depth of the skin that will be cut off from the donor skin area. This may be one or two or more thousandths of an inch depending upon circumstances. This gives a precision heretofore unattainable and enables the donor skin to be cut very thin. The latter is most important, especially in the case of skin of babies. The arrangement of the parts of the device with the cutter support bar 14 rotatable with the pintle 32 enables one hand to hold the device 10 with the curved surface 20 disposed upwardly while adjustment of the knife edge 35 is made quickly and accurately by the other hand operating from one end only of the bar 14.

The test piece of tape may be discarded, and a length of autoclaved tape is smoothed down over the donor skin and adhered thereto. The width of the carrier cloth may be greater than the width of the donor area of skin, and is preferably approximately 1.5" wide to correspond with the width of the curved surface 20. The piece of ribbon 57 is longer than the donor area of skin, and is made about 2.0" longer than the curved surface 20 to allow for it being engaged at its ends by the clamps 28, 30.

The skin carrier 10 is now placed on the tape 57 and one end thereof is fastened in one of the clamps 28, 30. The ribbon of cloth is now spread over the surface 20, and this places the opposite end thereof in position for engagement with the remaining clamp 28, 30. The operation of fastening the second clamp 28, 30 serves to take up slack in the ribbon 57 and to apply tension thereto, holding the tape taut against bulge of surface 20. The surface 20 is then rolled over the surface of the donor skin until one end of the donor area of skin by adhering to the cloth 57 is raised slightly. The other hand of the operator by exerting force on handle 12 swings the knife 34 under surface 20 severing the skin from the donor area, and the carrier 10 is rolled on the donor skin progressively in advance of the cutter 34 until the desired area of skin has been severed. Shaft 32 may be moved axially in the bore 31 of the hand grip 22 so that the operator can give a back and forth sidewise motion to the handle 12 and knife 34. The side edges of knife may be sharpened to cut, if necessary, during the sidewise motion.

When the entire desired donor area of skin has been severed, the skin carrier 10 is free to be lifted away from the donor. The tape may or may not be left on the device, but the skin is not removed from the tape. The skin is placed in position for the graft and any free end of tape may be used to secure the skin in its new position. Extra layers of tape may be placed across the original tape more firmly to secure it and the skin. When necessary the skin and tape are first removed from the carrier 10 and the skin and transparent tape may be clipped to special size and shape as when a plurality of grafts are to be juxtaposed.

The present device and method permits the removal of several square inches of skin all with a uniform depth which may be no more than one one-thousandth of an inch. The cloth 48, with the severed area of donor skin adhered thereto, operates to hold the skin area to its original dimensions and prevents it from shrinking. Prior art practice requires that the grafted skin be stretched over the recipient area and stitched in position on the recipient area by means of sutures. Such sutures are liable to fail, and in addition constitute a dangerous source of infection. By means of the cloth 48, the graft is maintained under normal tension at all times. The necessity for sutures is removed. The simplicity of operation, including determination of depth of cut of the present device permits and enables a relatively unskilled operator to use it in situations where speed is paramount.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. In a dermasector, a rigid piece embodying a surface that describes a convex arc of a cylinder, a rigid pedestal attached to the piece and projecting away from it on the side opposite the arcuate surface, the pedestal comprising a hand grip that embodies the axis of the arcuate surface and includes a bore coaxial therewith, a pintle fitted to bear in the bore and being longer than the bore to be movable longitudinally thereof, a pair of rigid arms respectively attached to corresponding opposite ends of the pintle, a bar adjacent to the convex surface and extending parallel with the axis thereof, each of the arms comprising a bearing for the bar, the bearings of the several arms being coaxial and being parallel with the axis of the arcuate surface, a cutter supported by the bar with its cutting edge parallel with the arcuate surface and off-center of the axis of the bearing, the cutting edge being spaced away from the arcuate surface a predetermined distance and the bar being rotatable in the bearings to adjust the space between the cutting edge and the arcuate surface.

2. In a dermasector as defined in claim 1, a worm carried by one of the arms, a worm wheel secured to the bar in mesh with the worm, a manually rotatable knob secured to the worm for rotating the bar for making the adjustment of the space between the cutting edge and the arcuate surface.

3. In a dermasector, a rigid piece embodying an arcuate surface, a support for the piece embodying the axis of the arcuate surface and including a coaxial pintle, a cutter and a bar supporting the cutter disposed with its cutting edge spaced away from the arcuate surface a predetermined distance, a pair of rigid arms respectively attached to corresponding opposite ends of the pintle and the bar, each of the arms comprising a bearing for the bar, the bearings of the several arms being coaxial with each other and being parallel with the axis of the arcuate surface, a cutter supported by the bar with its cutting edge parallel with the arcuate surface and off center of the axis of the bearings, adjusting mechanism to rotate the bar in its bearings to vary the spacing between the cutting edge and the arcuate surface.

4. In a dermasector as defined in claim 3, the adjusting mechanism comprising a worm gear attached to the bar, a worm in mesh therewith, and a manually rotatable knob operable to rotate the worm.

5. In a dermasector, a rigid arcuate piece comprising a surface that describes a convex arc of a cylinder, a rigid support for the piece projecting away from the inside thereof and embodying the axis of the arcuate surface, a cutter, a support for the cutter holding its cutting edge parallel with the arcuate surface and spaced away therefrom a predetermined distance, the support for the cutter comprising a pivot for swinging the cutter on an axis coincident with the axis of the arcuate surface, an attachment to hold a piece of cloth in taut condition against the arcuate surface and comprising a pair of clamps respectively engaging each of opposite ends of the piece of cloth and holding it near the end of the arc of the surface inside the curve thereof, one clamp comprising a cleat attached to and extending away from the arcuate piece inside the curve of the arcuate surface, a terminal flange projecting laterally away from the direction of extension of the cleat, a spring clip contoured companion to the cleat and its flange to stretch the cloth opposed to the opposite clamp by the cloth being gripped between the cleat and the clip.

6. In a dermasector as defined in claim 5, the second clamp comprising a cleat and a clip like the first clamp, the second cleat being attached to the arcuate piece inside the curve of the arcuate surface.

7. In a dermasector, a rigid piece embodying a convex surface that describes an arc of a cylinder, a pedestal rigidly attached to the piece on the side opposite the arcuate surface at a point opposite the center thereof, and projecting away from the piece to and beyond the axis of the arcuate surface, the pedestal comprising a hand grip around and extending along the axis of the arcuate surface, the handle having a bore coaxial with the arcuate surface, a pintle fitted to bear in the bore and being longer than the bore to be movable longitudinally thereof, a cutter disposed with its cutting edge positioned spaced away from the arcuate surface a predetermined distance, a pair of rigid arms attached to respective opposite ends of the pintle and each connected with an end of the cutter, a bar adjacent to the convex surface extending parallel with the axis thereof, each of the arms comprising a bearing for the bar, the bearings of the several arms being coaxial and being parallel with the axis of the arcuate surface, the bar comprising an attachment for the cutter to support it with its cutting edge off-center of the bar, the bar being rotatable in the bearings to adjust the space between the cutting edge and the arcuate surface.

SAMUEL GORDON BERKOW.

REFERENCES CITED

The following references are of record in the file of this patent:

UNITED STATES PATENTS

| Number | Name | Date |
| --- | --- | --- |
| 1,993,899 | Rieske | Mar. 12, 1935 |
| 2,079,979 | Worthington | May 11, 1937 |
| 2,288,709 | Hood | July 7, 1942 |
| 2,442,433 | Reese | June 1, 1948 |

OTHER REFERENCES

Jenny, J. A.: "Modification of the Plasma Fixation Method of Skin Grafting by Use of Bobbinet and a Mirror Attachment," Surgery, Gynecology and Obstetrics, June 1945, page 471.